United States Patent [19]

Garcia et al.

[11] Patent Number: 5,607,791
[45] Date of Patent: Mar. 4, 1997

[54] BATTERY INTERFACE STRUCTURE FOR AN ELECTRICAL DEVICE

[75] Inventors: Jorge L. Garcia, Plantation; Faris Habbaba, Boca Raton, both of Fla.; Mark C. Tarabolous, Chamblee; William C. Phelps, III, Lawrenceville, both of Ga.

[73] Assignee: Motorola, Inc, Schaumburg, Ill.

[21] Appl. No.: 679,414

[22] Filed: Jul. 8, 1996

[51] Int. Cl.⁶ .............................. H01M 2/10; H01M 2/30
[52] U.S. Cl. ........................ 429/96; 429/121; 429/123; 439/500
[58] Field of Search ................... 429/96–100, 121–123, 429/7; 439/500

[56] References Cited

U.S. PATENT DOCUMENTS

| | | | |
|---|---|---|---|
| 4,515,872 | 5/1985 | Okano | 429/123 X |
| 5,127,849 | 7/1992 | Karl et al. | 439/500 |
| 5,197,889 | 3/1993 | Rizzo et al. | 439/76 |
| 5,225,760 | 7/1993 | Leiserson | 429/98 X |
| 5,238,431 | 8/1993 | Kreisinger | 439/733 |
| 5,259,786 | 11/1993 | Huang | 429/100 |
| 5,403,203 | 4/1995 | Fischl et al. | 439/500 |
| 5,421,745 | 6/1995 | Askoy et al. | 439/626 |
| 5,466,545 | 11/1995 | Chamberlain et al. | 429/121 X |

*Primary Examiner*—Anthony Skapars
*Attorney, Agent, or Firm*—Andrew S. Fuller

[57] ABSTRACT

An electrical interface (125, 215) interconnects an electrical device (110) with a removable battery package (120). The electrical interface (125, 215) includes deflectable cantilever contacts (260) that are preferably located within the battery package (120). Each cantilever contact (260) has a portion (261) anchored to a substrate (250), and a deflectable portion (262) biased against a housing member (240), which deflectable portion (262) is externally accessible via a slot (248) within the housing member (240). Preferably, the cantilever contacts (260) are located within a recessed area (245) on an interior surface (241) of the housing member (240). A corresponding projection (346) extends externally on the housing member (240). The external projection (346) facilitates a plug and socket arrangement for mating the battery (120) to the electrical device (110). The substrate (250) is preferably formed from flexible film material and is structurally supported by a backer (270) attached to the housing member (240).

14 Claims, 4 Drawing Sheets

BATTERY INTERFACE STRUCTURE FOR AN ELECTRICAL DEVICE

TECHNICAL FIELD

This invention relates in general to electrical interface connectors, and more particularly, to a connector interfacing a battery to an electrical device.

BACKGROUND

Portable electronic devices, such as two-way radios, typically include a rechargeable battery that is removably connected to the electronic device. Ordinarily, the battery is electrically coupled to the electronic device via an electrical interface that includes a portion on the electronic device and a portion on the battery. The electrical interface generally has movable contacts and fixed contacts. The movable contacts facilitate the establishment of electrical contact between both portions of the electrical interface by accommodating for variations due to tolerances and like.

Fixed contacts are typically more inexpensive to incorporate within a product than are movable contacts. Hence, it is customary to find fixed contacts employed on the battery to minimize product costs. Such electrical contacts have been traditionally formed using discrete contact elements electrically coupled to circuitry within the battery. The discrete contacts may be affixed directly to a circuit carrying substrate used in the internal operations of the battery, or may be affixed to a battery housing member using a rivet, or other type of fastener.

Movable contacts are generally incorporated within that portion of the electrical interface on the host device. A movable contact tends to have more parts than a fixed contact, and thus is more expensive to incorporate into a product. Prior art approaches to movable contacts include the use of pogo pins, cantilever contacts, springs, and the like. By incorporating such movable contacts on the electronic device, the more expensive portion of the electrical interface can be incorporated into the higher priced unit, i.e., the electronic device. As a user is likely to purchase several batteries for each electronic device purchased, it is thought that by incorporating the less expensive component of the electrical interface on the battery, the overall cost to a customer is reduced.

It has been observed that a movable contact is much more susceptible to damage from corrosion, shock, jamming, and the like. When such contact is damaged, the electronic device must be taken out of service for repair or replacement of the contact. This deprives the user of the use of the electronic device, and thus runs contrary to the objective of reducing overall expense to the user. Fixed contacts, which have no movable parts, can be formed to be less prone to damage through normal use.

In an electrical interface, it is desirable to incorporate the reliability of fixed contacts while providing for the tolerance accommodation afforded by movable contacts. Therefore, there exists a need to provide for the incorporation of fixed and movable contacts in an electrical interface between an electronic device and a removable battery that is reliable and cost effective.

DETAILED DESCRIPTION OF THE PREFERRED EMBODIMENT

The present invention provides for an electrical interface that interconnects an electrical device with a removable battery. The electrical interface includes deflectable cantilever contacts that are preferably located within the battery housing. Each cantilever contact has a portion anchored to a substrate, and a deflectable portion biased against a housing member, which deflectable portion is externally accessible via a slot within the housing member. Preferably, the cantilever contacts are located within a recessed area on an interior surface of the housing member, with a corresponding projection extending externally on the housing member. The external projection facilitates a plug and socket arrangement for mating the battery to the electrical device. In the preferred embodiment, the substrate is a flexible film substrate that is structurally supported by a backer attached to the housing member.

Figure 1:
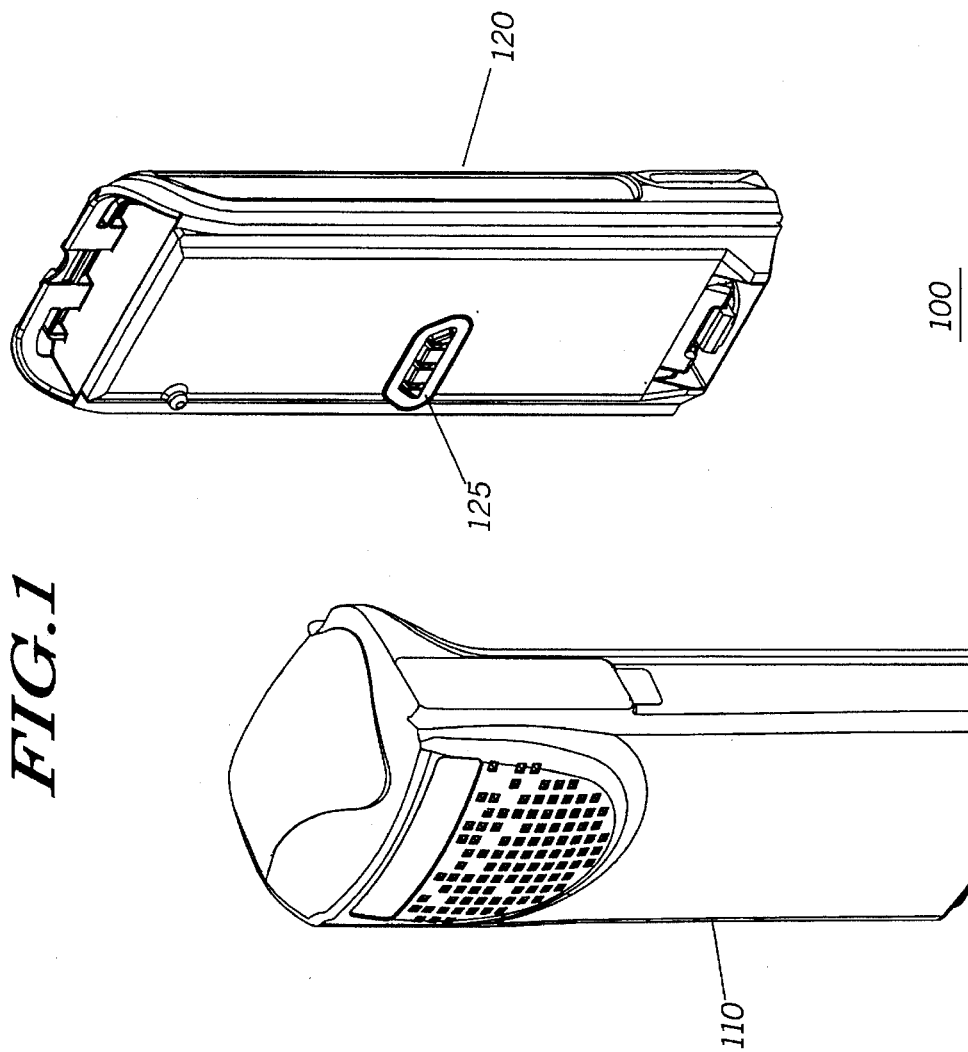
FIG. 1 is a perspective view of a radio and battery, in accordance with the present invention.

FIG. 1 is an exploded perspective view of an assembly 100 of an electrical device 110 and battery 120, in accordance with the present invention. The electrical device is a two-way portable radio that houses circuitry and components for communicating over a radio frequency channel. The battery is a packaged self-contained unit that is detachable or removable from the radio, such as for recharging purposes. The battery package 120 houses energy cells, circuitry, and other components typically included in a rechargeable battery. The radio 110 and battery package 120 incorporate an electrical interface or interconnecting structure that comprises mating electrical connectors 125, 215 (see FIG. 2).

Figure 2:
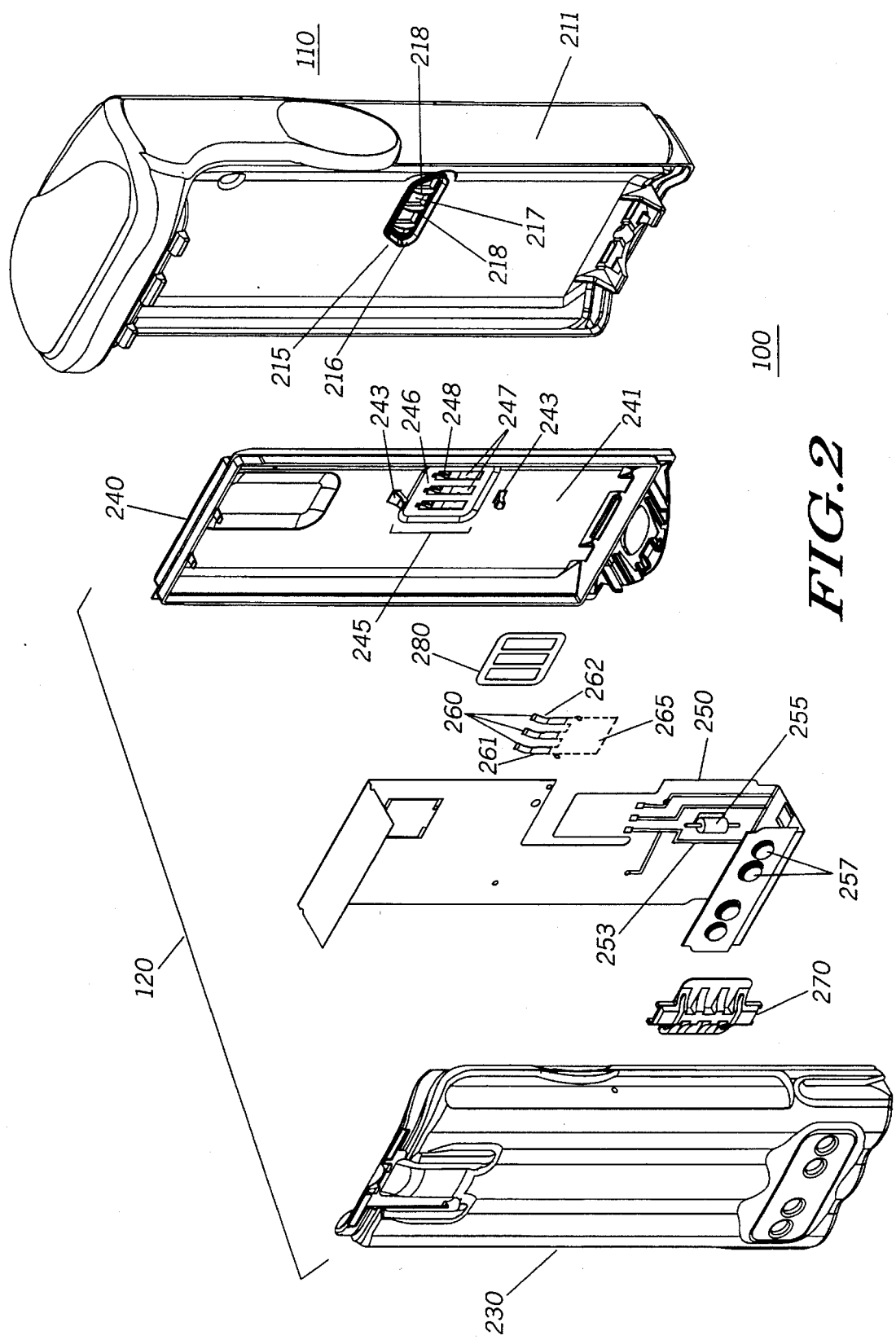
FIG. 2 is a exploded view in a first orientation of the radio and battery of FIG. 1 when assembled, in accordance with the present invention.
Figure 3:
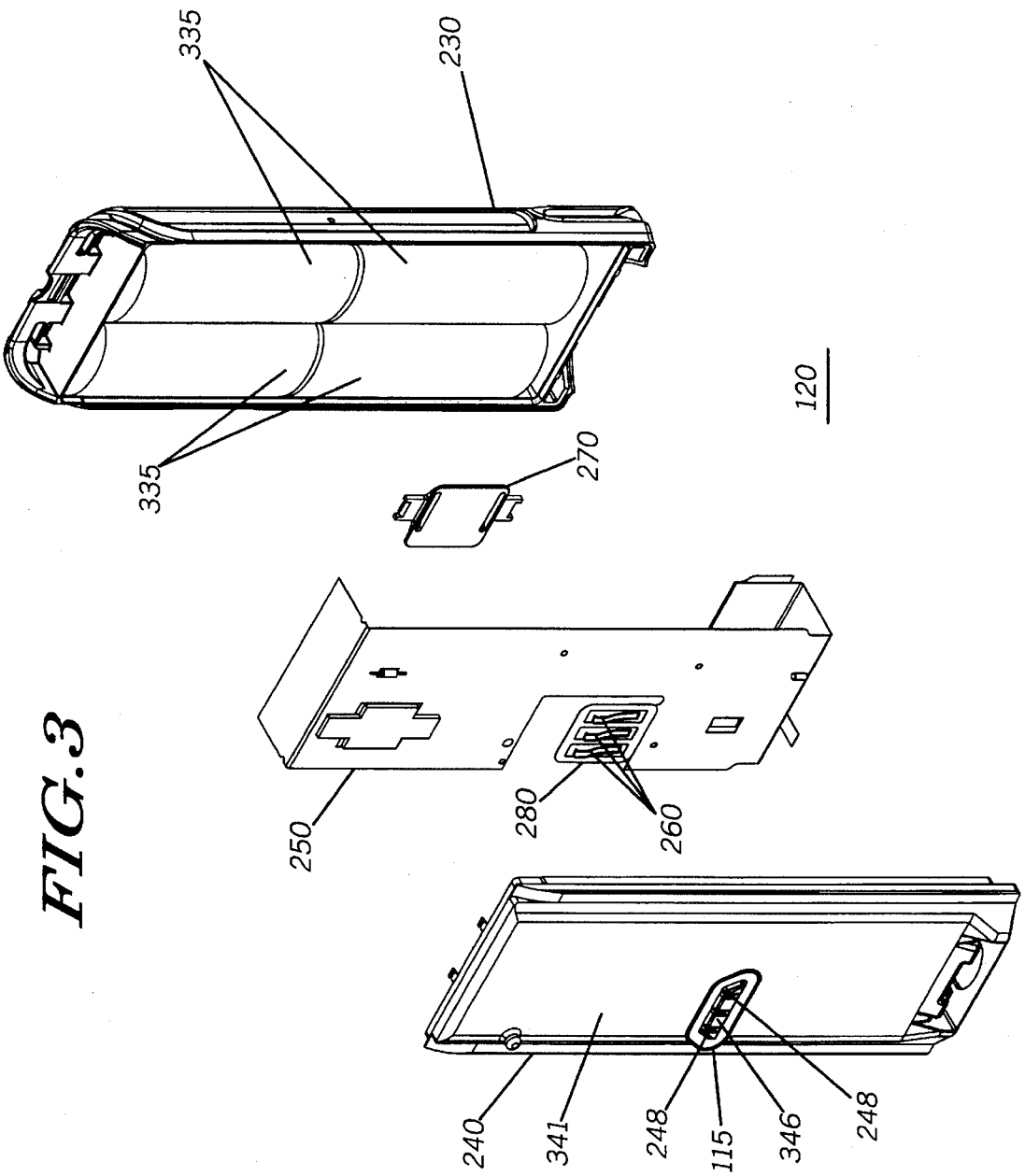
FIG. 3 is a exploded view of the battery highlighting a second orientation, in accordance with the present invention.

FIG. 2 is an exploded view of the radio and battery assembly 100 shown in a first orientation, in accordance with the present invention. FIG. 3 is an exploded view of the battery 120 shown in a second orientation, in accordance with the present invention. Referring to FIGS. 2 and 3, an electrical interface structure 125, 215 includes a portion 125 on the removable battery 120, an a portion 215 on the electrical device 110. On the electrical device 110, a device housing member 211 includes an electrical connector 215 defined by a recessed area with a set of spaced apart fixed contacts 218 projecting within the recessed area. In the preferred embodiment, the spaced apart contacts 218 have a blade-like form factor that corresponds in shape and size to slots on the electrical connector 125 of the battery package 120. A peripheral seal 216 around the electrical connector 215 of the radio 110 provides an environmental seal when interfaced to the battery package 120.

The removable battery 120 has battery housing members 230, 240, including a main housing member 230 and a battery cover 240, preferably formed from molded plastic material. The battery housing members 230, 240 enclose and protect energy cells 335 which provide the primary function of the battery package 120. The energy cells 335 may incorporate battery chemistry such as nickel cadmium, nickel metal-hydride, lithium ion, and the like. A substrate 250 formed from flexible film material carries battery circuitry 253 and electrical and mechanical components 255, 257 needed to support monitoring, charging, discharging, and the other functions relating to the energy cells 335. The circuitry 253 is electrically coupled to the energy cells 335.

As noted above, the battery package 120 includes the electrical connector 215 which supports the conveyance of electrical signals between the battery package 120 and the electrical device 110. The electrical connector 215 is formed using an electrical interface area 245 defined on a battery housing member 240. Movable cantilever contacts 260, electrically coupled to the substrate 250, are biased against the battery housing member 240, preferably by a backer or support member 270, along the electrical interface area 245. A gasket 280 interposed between the substrate 250 and battery housing member 240 provides an environmental seal for the connector.

In the preferred embodiment, the electrical interface area 245 is defined on the battery cover 240, such as by molding, and is formed to accommodate the cantilever contacts. The electrical interface area 245 is defined by a recessed portion 246 on the interior surface 241 of the battery cover 240 and a corresponding projection or protruded portion 346 on the exterior surface 341 of the battery cover 240. Preferably, the recessed portion 246 has multiple, separate, individualized contact recesses or grooves 247 for individually accommodating each cantilever contact 260, or a portion thereof. Accordingly, each contact recess 247 has a form factor corresponding in shape and size to that of the cantilever contact 260. Further, each contact recess 247 has a slot 248 extending from the interior surface 241 of the battery cover 240 to the exterior surface 341, such that there are as many slots 248 as there are cantilever contacts 260.

The cantilever contacts 260 are preferably formed from a single-piece stamped metal part. In the preferred embodiment, the stamped metal part comprises multiple cantilever arms or fingers joined together by a detachable bridge member 265. The cantilever arms 260 are affixed to the flexible film substrate 250 by depositing solder at an anchor portion 261 of each cantilever arm 260. The bridge member 265 is then detached to leave multiple cantilever arms 260 individually attached or anchored to the flexible film substrate 250 in proper alignment.

To assemble, the cantilever contacts 260 are affixed to the flexible film substrate 250 and the gasket 280 located about each cantilever contact 260. The gasket 280 is affixed to the substrate 250, such as by adhesive or the like. The substrate 250 is then positioned against the battery housing member 240 such that the cantilever contacts 260 are seated in the corresponding contact recesses 247 within the electrical interface area 245 of the battery housing member 240. Once the cantilever contacts 260 are properly seated within the contact recesses 247, the backer 270 is mounted or otherwise attached to the battery housing member 240, preferably using mounts 243 located on the battery housing member 240. Thus, the backer 270 is positioned to provide mechanical support or a biasing force for the cantilever contact members 260.

When the electrical connector 125 is fully assembled, portions 262 of the cantilever contacts 260 are individually seated within corresponding recesses 247, and are deflectably biased against the interior surface 241 of the housing member 240 in alignment with corresponding slots 248 in the contact recesses 247. The contacts 260 are completely recessed below the exterior surface of the housing member 240. The gasket 280, which is positioned about the contacts 260, individually, between the substrate 250 and the interior surface 241 of the battery housing member 240, provides a seal that individually protects each slot 248.

In summary, the preferred embodiment includes a removable battery 120 attached to a portable electrical device 110 with an electrical interface therebetween. A connector portion 125 on the removable battery is formed on a battery housing member 240 by a recessed portion along an interior surface, and a corresponding protruded portion on an exterior surface. The housing member 240 has slots 248 extending therethrough that expose a corresponding set of cantilever contacts 260. Each cantilever contact 260 has a cantilever portion 262 aligned with a corresponding slot, and is deflectably bias against an interior surface of the battery housing member. The contacts are protected by being completely recessed within the housing member 240. On the electrical device 110, a recessed area 217 formed within a device housing member 211 includes spaced apart contacts 218 that project within the recessed area 217.

Figure 4:
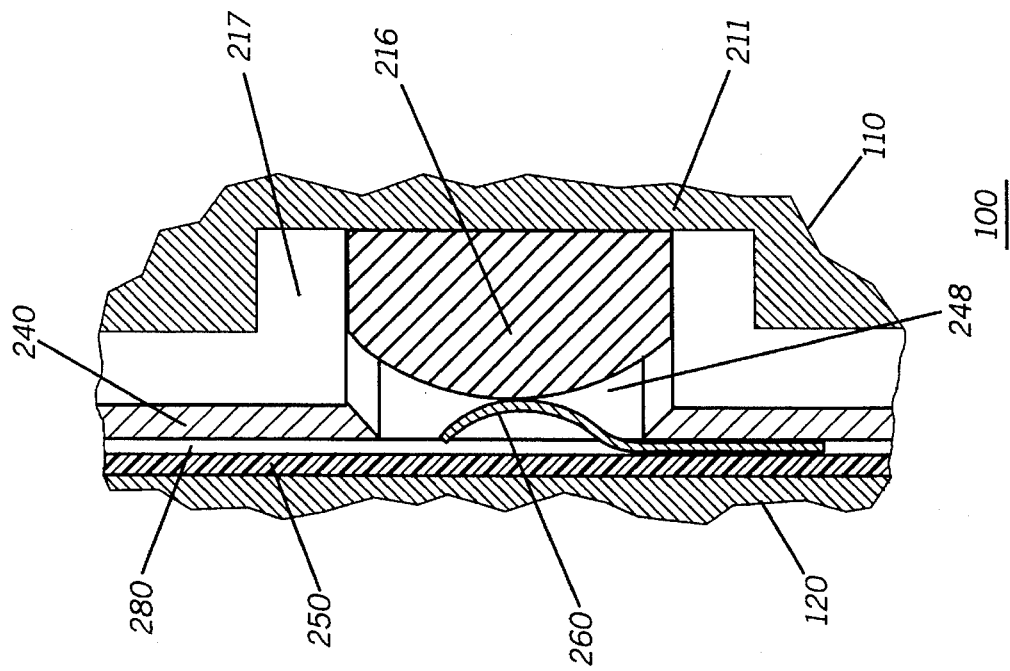
FIG. 4 is a fragmentary cross-sectional view of the radio and battery assembly of FIG. 2 highlighting the electrical interface, in accordance with the present invention.

FIG. 4 is a fragmentary cross-sectional view showing the electrical interface between a radio and battery, in accordance with the present invention. Here, the protruded portion 346 of the battery housing member 240 is seated within the recessed area 217 of the device housing member 211 such that the contacts 218 on the device 110 interface with the cantilever contacts 260 on the battery package 120 in a plug and socket arrangement, when the removable battery is mated with the electrical device.

The present invention provides significant benefits over the prior art. For example, by employing fixed contacts on the host electronic device, the reliability of the electrical interface on the electronic device can be improved. Similarly, a proper electrical connection between the removable battery and the electronic device is assured by employing movable contacts on the battery in an inexpensive manner. Additionally, by positioning the biased cantilever contacts in a plug and socket arrangement, ease of use of the electrical interface is enhanced, and the contacts are protected from damage. These configurations and others are made available by the present invention.

What is claimed is:

1. An electrical interface structure for a removable battery, comprising:

a battery housing member having an interior surface and an exterior surface, and an electrical interface area defined by a recess on the interior surface and a corresponding projection on the exterior surface, the electrical interface area having a plurality of slots extending therethrough; and a plurality of cantilever contacts corresponding to the plurality of slots, each cantilever contact having an anchored portion being fixedly located with respect to the electrical interface area, and having a deflectable cantilever portion seated within the recess and biased against the interior surface of the battery housing member, and externally accessible via a corresponding slot from the exterior surface of the battery housing member, wherein the plurality of cantilever contacts are completely recessed below the exterior surface of the battery housing member.

2. The electrical interface structure of claim 1, further comprising a substrate having circuitry thereon, wherein the anchored portion of each cantilever contact is soldered to the substrate and electrically coupled to the circuitry.

3. The electrical interface structure of claim 2, wherein the substrate is a flexible film substrate.

4. The electrical interface structure of claim 2, further comprising a backer attached to the battery housing member, wherein the substrate is positioned between the backer and the interior surface.

5. The electrical interface structure of claim 4, further comprising a gasket positioned between the substrate and the interior surface that provides a seal for the plurality of slots.

6. The electrical interface structure of claim 1, wherein the electrical interface area has a groove about each slot that corresponds in shape and size to a cantilever contact, and wherein the plurality of cantilever contacts are each individually seated within a corresponding groove.

7. A battery, comprising:
- a battery cover having an interior surface and an exterior surface, the battery cover having an electrical interface area defined by a recessed portion on the interior surface and a corresponding protruding portion on the exterior surface, the recessed portion having a plurality of contact recesses each having a slot extending therethrough;
- a flexible film substrate having battery circuitry thereon;
- a plurality of cantilever contact members affixed to the flexible film substrate, each cantilever contact member being seated within a corresponding contact recess, and having a cantilever portion deflectably biased against the interior surface of the battery cover in alignment with a corresponding slot;
- a backer mounted to the battery cover and positioned to provide mechanical support for the plurality of cantilever contact members; and
- a gasket positioned around the plurality of cantilever contact members between the battery cover and the flexible film substrate.

8. An apparatus having an electrical interface, comprising:
a removable battery, comprising:
- a battery housing member having an electrical interface area defined by a recessed portion along an interior surface thereof, and a corresponding protruded portion on an exterior surface thereof, the electrical interface area having a plurality of slots extending therethrough; and
- a plurality of cantilever contacts, each having a cantilever portion aligned with a corresponding slot of the plurality of slots, each cantilever portion being deflectably biased against the interior surface of the battery housing member; and
a portable electrical device, comprising:
- a device housing member having a recessed area formed thereon; and
- a plurality of spaced apart contacts, projecting within the recessed area;
wherein the protruded portion of the battery housing member is seated within the recessed area of the device housing member such that the plurality of spaced apart contacts interface with the plurality of cantilever contacts in a plug and socket arrangement, when the removable battery is mated with the portable electrical device.

9. The apparatus of claim 8, wherein the removable battery further comprises a substrate mounted adjacent to the recessed portion of the electrical interface area, and wherein each of the plurality of cantilever contacts has an anchored portion fixedly attached to the substrate.

10. The apparatus of claim 9, wherein the substrate is a flexible film substrate.

11. The apparatus of claim 10, further comprising a backer mounted to the battery housing member, wherein the substrate is positioned between the backer and the interior surface.

12. The apparatus of claim 9, further comprising a gasket positioned between the substrate and the interior surface to individually seal each of the plurality of slots.

13. The apparatus of claim 9, wherein the battery housing member has a separate recess in the electrical interface area to individually seat at least a portion of each of the plurality of cantilever contacts.

14. A battery, comprising:
- a battery housing member having an interior surface and an exterior surface, and having a plurality of slots extending therethrough;
- a plurality of energy cells protected by the battery housing member;
- a flexible film substrate having circuitry that is electrically coupled to the plurality of energy cells;
- a plurality of cantilever contacts each having an anchored portion affixed to the flexible film substrate, and a deflectable cantilever portion biased against the interior surface of the battery housing member, and externally accessible via a corresponding slot from the exterior surface of the battery housing member; and
- a backer attached to the battery housing member and positioned to provide support for the flexible film substrate, and to provide a biasing force for the plurality of cantilever contacts.

\* \* \* \* \*